United States Patent
Newell

[11] Patent Number: 5,921,161
[45] Date of Patent: Jul. 13, 1999

[54] CONVERSION DEVICE FOR HAND-HELD POWER TOOLS

[76] Inventor: Robert M. Newell, 18801 View Cir., Fiddletown, Calif. 95629

[21] Appl. No.: 08/694,518

[22] Filed: Aug. 9, 1996

[51] Int. Cl.[6] .............................. B26D 5/08; B25H 1/00
[52] U.S. Cl. ..................... 83/574; 83/468.7; 83/486.1; 83/745; 144/286.1
[58] Field of Search .................. 83/574, 468.7, 83/468.1, 745, 486.1; 144/48.6, 286.1, 286.5

[56] References Cited

U.S. PATENT DOCUMENTS

| | | | |
|---|---|---|---|
| 1,846,641 | 2/1932 | Hedgpeth | 83/574 |
| 2,627,880 | 2/1953 | Johnson | 83/574 |
| 2,765,820 | 10/1956 | Perkins | 83/574 |
| 3,043,351 | 7/1962 | Davis . | |
| 3,073,360 | 1/1963 | Villanueva | 83/574 |
| 4,016,649 | 4/1977 | Kloster . | |
| 4,111,409 | 9/1978 | Smith | 83/468.1 |
| 4,128,940 | 12/1978 | Ong . | |
| 4,378,716 | 4/1983 | Volk | 83/574 |
| 4,509,398 | 4/1985 | Mason | 83/574 |
| 4,630,656 | 12/1986 | Collins | 83/574 |
| 4,736,523 | 4/1988 | Hanning . | |
| 4,852,257 | 8/1989 | Moore . | |
| 4,995,288 | 2/1991 | DellaPolla | 83/574 |
| 5,035,061 | 7/1991 | Bradbury et al. . | |
| 5,080,152 | 1/1992 | Collins et al. | 83/574 |
| 5,107,736 | 4/1992 | Albrecht | 83/574 |
| 5,285,831 | 2/1994 | Woolgar | 144/48.6 |

*Primary Examiner*—M. Rachuba
*Assistant Examiner*—Sean A. Pryor
*Attorney, Agent, or Firm*—Brian Beverly

[57] ABSTRACT

An improved conversion device for use with hand-held power tools having a rigid base portion firmly affixed to a work surface. An elongated arm is affixed to the base allowing the arm to slide longitudinally on the base and above the work surface for substantially the full length of the arm. A power tool is mounted to the distal end of the arm, the blade or other tool head of the power tool projecting downward through a hole in the arm. The arm can be adjusted and fixed in position to set the distance between the blade or other tool head and a side-facing guide surface on the base according to the dimension of a cut to be made in a work piece.

14 Claims, 4 Drawing Sheets

CONVERSION DEVICE FOR HAND-HELD POWER TOOLS

BACKGROUND OF THE INVENTION

The present invention relates to assistive devices for hand-held power tools. In particular, it relates to a conversion tool for use with a hand-held circular saw for easy creation of a table saw equivalent for making long and accurate cuts in large work pieces such as plywood. This invention also relates to a conversion tool for use with a hand-held router for creation of a hands-free table top router for accurate use of the router on large work pieces.

Large work pieces such as plywood, particle board, fiber boards and plastic laminates have become common building materials. Proper application of these materials usually involves making two or more long cuts in the work pieces. Work on large work pieces, especially multiple pieces, is more efficiently performed in a workshop setting having traditional table saws and other more permanently mounted equipment. However, it is expensive, difficult and inefficient to move such equipment to a job site. For convenience and practical reasons, cuts are usually made on the job site.

As a consequence of the difficulty of transporting table saws and other larger pieces of equipment to job sites, multiple tools and devices have been created in the prior art to assist the on site builder. For example, several saw guides have been developed to help guide the user of a circular saw to make cuts in large work pieces. Such devices attach directly to the saw or other tool and two hands are generally required to manipulate the combination tool and guide. Use of such guides also requires a working surface large enough to stabilize or anchor the work piece upon which the cut or other operation will be performed. Valuable time is needed to manipulate each respective work piece into position on which to be worked. The combination of such guides with the saw or other tool can make the combined tool unwieldy to use.

SUMMARY OF THE INVENTION

It is a primary objective of the present invention to provide a device to allow better and more efficient use of hand-held power tools. It is a further objective of the present invention to provide an improved conversion device for use with hand-held power tools, such as a circular saw, to enable use of the hand held power tool as a stable table top operated tool. It is a still further objective of the present invention to provide an improved conversion device for hand-held power tools to allow better and more accurate operation of the power tools on large work pieces. A yet further objective of the present invention is to provide an improved conversion device for hand-held power tools which is relatively inexpensive and easily transportable.

A conversion device for hand-held power tools in accordance with the invention includes a planar elongated arm having at a distal end a saw blade opening for the blade of a circular saw. The saw is fastened to the distal end of the arm using fasteners typically available such as threaded bolts and wingnuts. The saw blade projects through the saw blade hole in the arm. A rigid base is securely affixed to a work surface, such as to a thick piece of plywood, typically using threaded fasteners. The base is equipped with an upward facing support surface and two threaded fasteners firmly mounted to the base and projecting upwards past the support surface. The arm has two oppositely disposed longitudinal slots through which the threaded fasteners pass and are used with nuts to mount the arm on the base. The lower surface of the arm is in contact with the support surface of the base and is slidable longitudinally over the base and above the work surface. The arm can thus be adjusted to fix the distance between the saw blade and a side facing guide surface on the base according to the dimension of a cut to be made in a work piece. Leaf springs mounted on the underside of the arm help the operator hold the work piece to the work surface. Measuring indicia on the arm enable easy calculation of the distance between the saw blade and the guide surface.

DESCRIPTION OF THE ILLUSTRATED EMBODIMENT

A conversion device for hand-held power tools is described.

Figure 1:
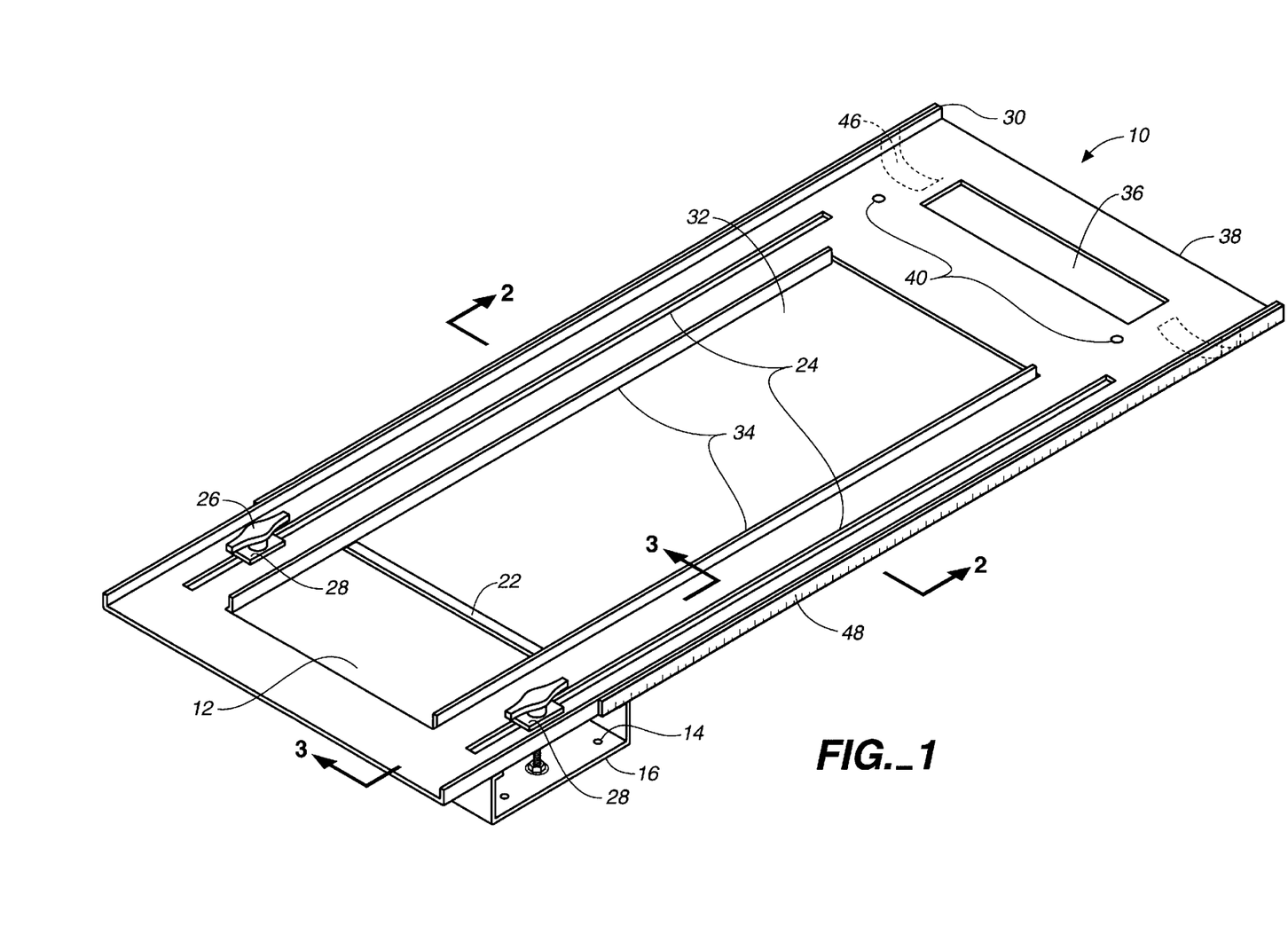
FIG. 1 is a perspective view of a conversion device for hand-held power tools in accordance with the invention.

The conversion device comprises a substantially planar rigid arm 10 and a rigid base 12 as best seen in FIG. 1. The base 12 is firmly affixed to a work surface such as a thick piece of plywood using commonly available fasteners passed through holes 14 in the bottom portion 16 of the base 12. In normal operation in the field, the base can be screwed, bolted or even nailed to the work surface, so long as the method of attachment used firmly secures the base to the work surface. The base has upwardly projecting sidewalls 18, each sidewall having an upper flange 20. The upper flanges 20 collectively comprise a support surface 22 for the arm 10.

The arm 10 is mounted on the base 12 to allow it to slide along substantially its entire length on the support surface 22 of the base 12. Longitudinal slots 24 run substantially the length of the arm 10. Threaded fasteners 26 are firmly mounted to the base and project upwardly through the longitudinal slots 24. In the preferred embodiment, washers 28 on the threaded fasteners 26 spread the load of the arm around the slots 24.

The arm 10 includes integral oppositely disposed upwardly projecting lips 30 along the entire length of the arm 10 for strength and rigidity. The arm 10 further includes a large hole 32 to make the arm lighter. Running the length of the hole 32, oppositely disposed integral longitudinal flanges 34 provide added rigidity and strength to the arm 10.

Figure 2:
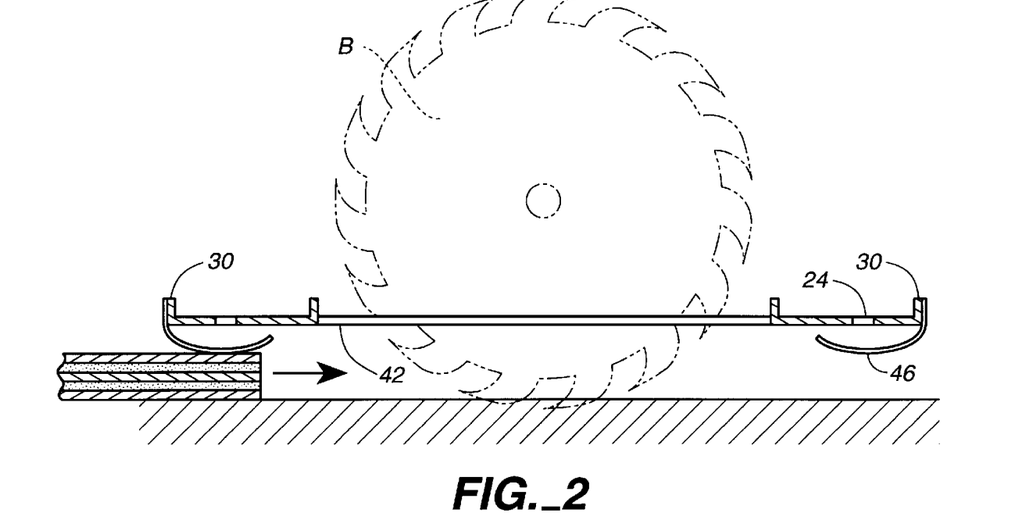
FIG. 2 is a section view of the arm of the conversion device in accordance with the invention taken along section lines 2—2 shown in FIG. 1.
Figure 3:
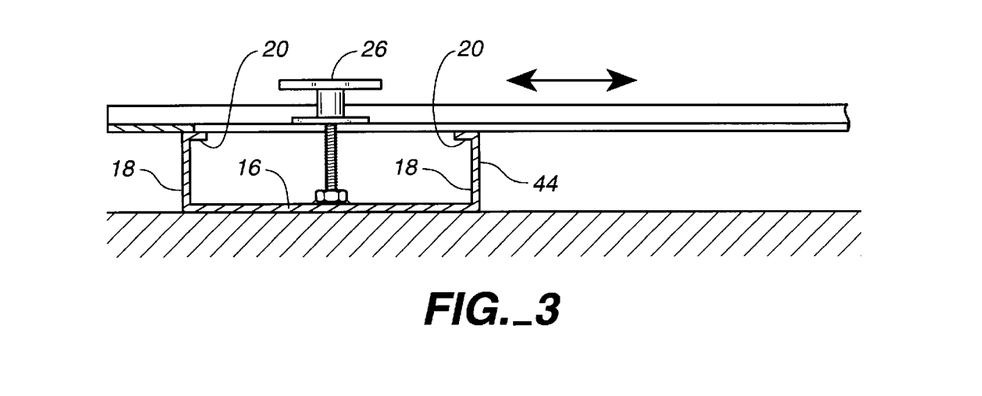
FIG. 3. is a front section view of the base of the conversion device in accordance with the invention taken along lines 3—3 shown in FIG. 1.
Figure 4:
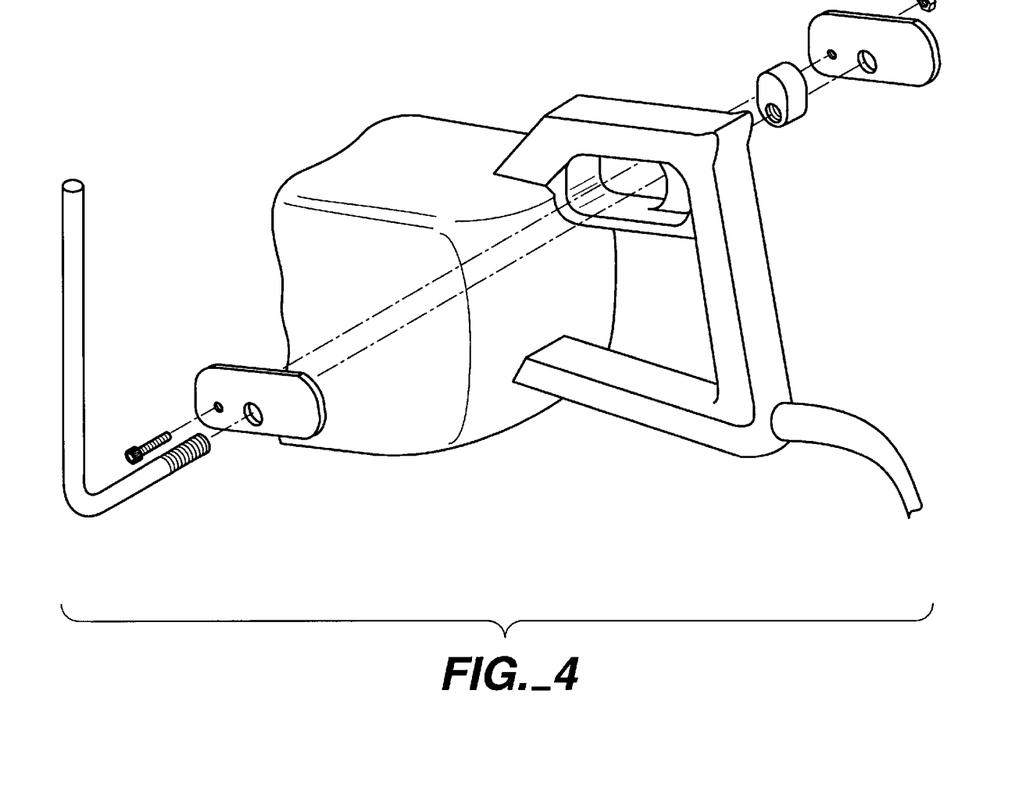
FIG. 4 is a side view of the trigger actuating cam of the conversion device in accordance with the invention showing the trigger depressed in the on position.
Figure 5:
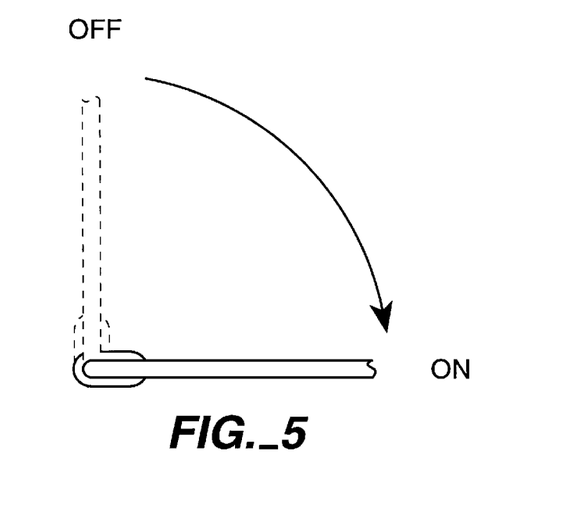
FIG. 5 is a side view of the trigger actuating cam of the conversion device in accordance with the invention showing the trigger depressed in the off position.

A saw blade opening 36 is provided at the distal end 38 of the arm 10. A standard circular saw S is attached to the arm 10 at the distal end 38 using commonly available threaded saw mounting fasteners passed up through saw mounting holes 40. Other means for mounting different kinds of circular saws and other tools such as routers may readily be used in other preferred embodiments. In the illustrated embodiment, the saw S is mounted to the arm 10 so that its blade B projects below the lower surface 42 of the arm 10 for free rotation. Typically the saw blade in operation will dig into the work surface a fraction of an inch as shown in FIG. 2.

The arm 10, once firmly mounted on the base 12, is cantilevered over the work surface leaving space between the lower surface 42 of the arm 10 and the work surface for insertion of a work piece such as a piece of plywood or fiber board. The outer surface of one of the upwardly projecting sidewalls 18 of the base 12 facing the saw blade S forms a guide surface 44 for guiding of a work piece while being passed between the arm 10 and the work surface.

The base 12 is of a vertical dimension sufficient to lift the arm 10 off the work surface to allow a standard piece of plywood or other commonly used construction board material to be placed on the work surface and underneath the lower surface of the arm 10. Fastening of the base 12 to the work surface by using screws or bolts requires sacrificing a sheet of plywood or other board material on the jobsite, but allows the construction of the base to remain simple, thereby driving down manufacturing costs for the device. Similarly, attachment of the arm 10 to the base 12 using slots 24 and threaded fasteners 26 allows longitudinal adjustment and radial adjustment of the arm 10 directed to the primary use of the device for making cuts or other powered operations on large work pieces. The relatively simple method for attachment of the arm 10 to the base 12, as with the base, allows economical manufacturing of the device and quick and easy assembly and disassembly of the device at the job site.

In the illustrated embodiment, the arm 10 is equipped with leaf springs 46 disposed below the lower surface 42 of the arm 10 to bias downward against a work piece. Measuring indicia 48 are attached to the longitudinal lips 30 of the arm 10 to facilitate measuring distances between the saw blade S and the guide surface 44 of the base 12. Alternatively, a standard rip fence can be attached to the work surface immediately adjacent the guide surface, and the work piece may be guided along the rip fence. The arm 10 is drawn away from the guide surface 44 of the base 12, or the rip fence, according to the dimension of a cut to be made in a work piece. The disposition of the longitudinal slots 34 allows the arm 10 to rotate slightly radially with respect to the base 12. The user may adjust the radial position of the arm 10 to ensure parallel placement of the saw blade S with the guide surface 44 of the base 12, or the rip fence, to prevent binding of the saw when cutting a work piece.

Figure 1A:
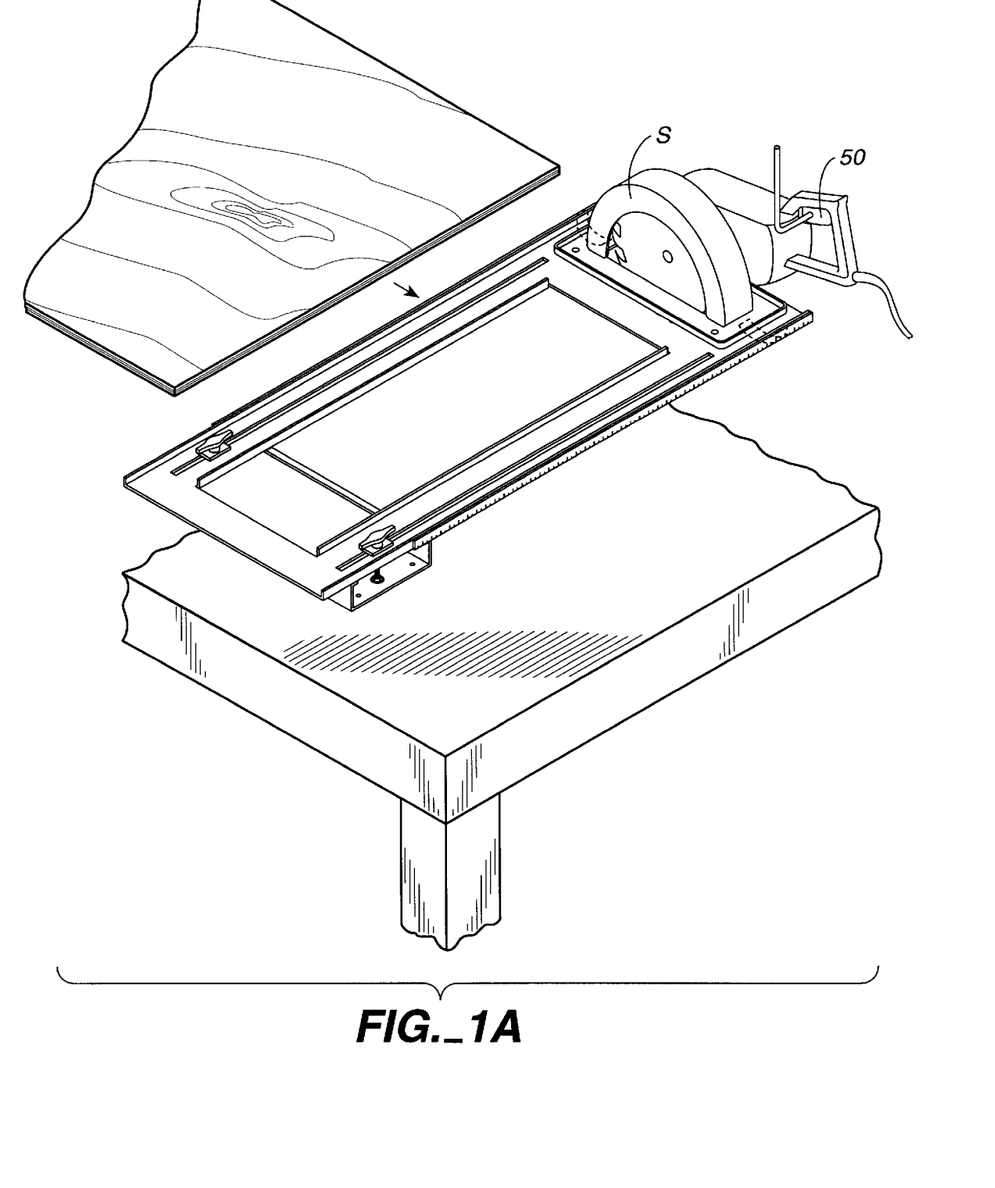
FIG. 1A is a perspective view of a conversion device for hand-held power tools in accordance with the invention with a circular saw attached to the arm of the device, the device secured to a work surface, and a work piece being fed between the arm and the work surface.

A trigger activating cam 50 is provided for attachment to the circular saw S as seen in FIG. 1A. The cam 50 sits adjacent the trigger in the off position. Rotation of the cam 50 ninety degrees depresses the trigger and activates the saw S for hands-free operation.

There have thus been described certain preferred embodiments of a conversion device for hand-held power tools. While preferred embodiments have been described and disclosed, it will be recognized by those with skill in the art that modifications are within the true spirit and scope of the invention. The appended claims are intended to cover all such modifications.

I claim:

1. A conversion device for attachment to a work surface for use with a hand-held power tool having a tool head for performing operations on a work piece, the conversion device comprising
   - a rigid base including at least two upwardly projecting fastening means,
   - means for removably securing the base to the work surface,
   - a substantially planar elongated arm having a lower surface, a distal end, and two spaced, oppositely disposed slots extending longitudinally for substantially the length of said arm, said slots defining horizontal slot openings in said lower surface of said arm, each said slot sized to freely and slidingly receive one of said upwardly projecting fastening means of said rigid base for fastening said arm in sliding engagement with said base, said arm fastening in sliding engagement to said base, said arm slidable longitudinally, said lower surface of said arm spaced from and substantially parallel to the work surface for free insertion of a work piece,
   - mounting means for removable mounting of a power tool to the distal end of said arm,
   - said arm further having a tool head opening at the distal end sized to receive freely the tool head of a power tool such that the tool head of a power tool may project through the tool head opening and below the lower surface of the arm,
   - whereby the location of the tool head opening may be adjusted for performing an operation on a work piece by the tool head of a power tool projecting through said tool head opening.

2. The conversion device of claim 1 wherein
   said mounting means includes means for removable mounting of a circular saw to the distal end of said arm, and
   said tool head opening is sized to receive freely the blade of a circular saw.

3. The conversion device of claim 1 wherein
   said rigid base includes a planar bottom portion for direct contact with the work surface, a guide surface disposed in a vertical plane projecting upwardly from said bottom portion, and a support surface disposed in a horizontal plane, said lower surface of said arm in sliding engagement with said support surface of said base,
   such that the location of said tool head opening may be adjusted relative to said guide surface of said rigid base for performing an operation on a work piece by the tool head of a power tool protecting through said tool head opening.

4. The conversion device of claim 3 wherein
   said base has oppositely disposed sidewalls projecting upwardly from said bottom portion, said sidewalls lying in substantially parallel planes, each sidewall having an upper flange, each flange having an upper surface, the upper surfaces of both flanges substantially lying in a plane substantially parallel to the work surface,
   said support surface of said base comprising said upper surfaces of said flanges of said sidewalls of said base.

5. The conversion device of claim 3 wherein
   the means for securing the base to the work surface includes threaded fasteners, and
   the base includes a plurality of holes sized to receive said fasteners.

6. The conversion device of claim 3 wherein
   said mounting means includes means for removable mounting of a circular saw to the distal end of said arm, and said tool head opening is sized to receive freely the blade of a circular saw.

7. The conversion device of claim 1 wherein said fastening means of said base includes a plurality of square washers.

8. The conversion device of claim 1 wherein said arm includes oppositely disposed longitudinal edges, each said edge having an upwardly depending lip extending the length of said arm for longitudinal strengthening of said arm.

9. The conversion device of claim 1 wherein said arm includes an interior opening defining oppositely disposed edges running longitudinally to said arm.

a flange integral with and projecting upwardly from each said edge of said interior opening for longitudinal strengthening of said arm.

10. The conversion device of claim 9 wherein said arm includes oppositely disposed longitudinal edges, each said edge having an upwardly depending lip extending the length of said arm for longitudinal strengthening of said arm, each said lip spaced from one of said flanges of said interior opening, and each of said fastening means of said base includes a square washer disposed between and having a cross-section substantially equal to the space between one of said flanges and one of said lips.

11. The conversion device of claim 1 wherein said arm is cantilevered such that said distal end of said arm projects freely over the work surface from said base.

12. The conversion device of claim 8 including measuring indicia mounted to said lips of said arm for longitudinal measuring.

13. The conversion device of claim 1 wherein said slots of said arm have a width with respect to said upwardly projecting fastening means which allows said arm to be adjusted radially from said base.

14. A conversion device for attachment to a work surface for use with a portable circular saw having a blade to make cuts in a work piece, the conversion device comprising a rigid base having a guide surface disposed in a vertical plane, oppositely disposed, upwardly projecting sidewalls, said sidewalls lying in substantially parallel vertical planes, each said sidewall having a flange, each said flange having an upper surface, said upper surfaces collectively forming a support surface disposed in a horizontal plane, and threaded fastening means projecting upwardly past said support surface of said base, means for firmly, yet removably, securing said base to the work surface, a substantially planar elongated arm having a lower surface, a distal end, and two spaced, oppositely disposed slots extending longitudinally for substantially the length of said arm, said slots defining horizontal slot openings in said lower surface of said arm, each said slot sized to freely and slidingly received one of said upwardly projecting fastening means of said rigid base for fastening said arm in sliding engagement with said base, said lower surface of said arm in sliding engagement with said support surface of said base, said arm slidable longitudinally, said arm cantilevered such that said distal end of said arm projects freely over the work surface from said base, mounting means for removably mounting a circular saw to said distal end of said arm such that the saw blade of a circular saw mounted on said distal end projects through said saw blade opening below said lower surface of said arm, so that the arm may be adjusted longitudinally such that the blade of a circular saw projecting through said saw blade opening may be spaced from said guide surface of said rigid base for performing a cut on a work piece.

\* \* \* \* \*

UNITED STATES PATENT AND TRADEMARK OFFICE
CERTIFICATE OF CORRECTION

PATENT NO. : 5,921,161

DATED : July 13, 1999

INVENTOR(S) : Robert M. Newell

It is certified that error appears in the above-identified patent and that said Letters Patent is hereby corrected as shown below:

Insert the following added claims:

15. The conversion device of claim 2 wherein:
the mounting means for removably mounting the circular saw to the distal end of the arm includes threaded fastening means.

16. The conversion device of claim 2 wherein:
said arm includes oppositely disposed longitudinal edges, each said longitudinal edge having a lip integral with said arm projecting upwardly from each said longitudinal edge substantially perpendicularly to the lower surface of said arm for longitudinal strengthening of said arm.

17. The conversion device of claim 2 wherein:
said arm includes a hole.

18. The conversion device of claim 2 wherein:
spring means mounted to said arm adjacent said tool head opening in said distal end of said arm, said spring means biased downwardly below the lower surface of said arm for controlling a work piece inserted between said arm and the work surface.

UNITED STATES PATENT AND TRADEMARK OFFICE
CERTIFICATE OF CORRECTION

PATENT NO. : 5,921,161
DATED : July 13, 1999
INVENTOR(S) : Robert M. Newell

It is certified that error appears in the above-indentified patent and that said Letters Patent is hereby corrected as shown below:

19. The conversion device of claim 2 for use with a hand-held circular saw having a saw blade and a trigger, said conversion device including:
means for depression of the trigger on the circular saw for continuous handsfree activation of the saw blade.

20. The conversion device of claim 27 wherein:
said means for depression of the trigger comprises a cam
means for mounting of said cam to hold said cam in contact with the trigger of the saw, and
means for rotation of said cam for depression of the trigger to activate the saw blade.

21. The conversion device of claim 28 wherein:
said cam is rotatable in a plane, and
said means for rotation of said cam comprises a bar secured to said cam, said bar having a handle portion disposed substantially parallel to said plane of rotation.

UNITED STATES PATENT AND TRADEMARK OFFICE
CERTIFICATE OF CORRECTION

PATENT NO. : 5,921,161

DATED : July 13, 1999

INVENTOR(S) : Robert M. Newell

It is certified that error appears in the above-identified patent and that said Letters Patent is hereby corrected as shown below:

22. The conversion device of claim 2 including:
a sawdust guard attached to said distal end of said arm adjacent said tool head opening.

Signed and Sealed this

Fifth Day of October, 1999

*Attest:*

Q. TODD DICKINSON

*Attesting Officer*      *Acting Commissioner of Patents and Trademarks*